P. HECHKOVECH.
BRAKE FOR SLEDS.
APPLICATION FILED FEB. 27, 1918.
1,299,338. Patented Apr. 1, 1919.
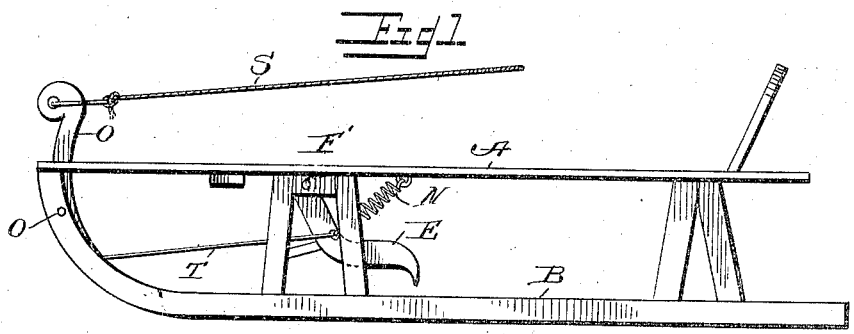
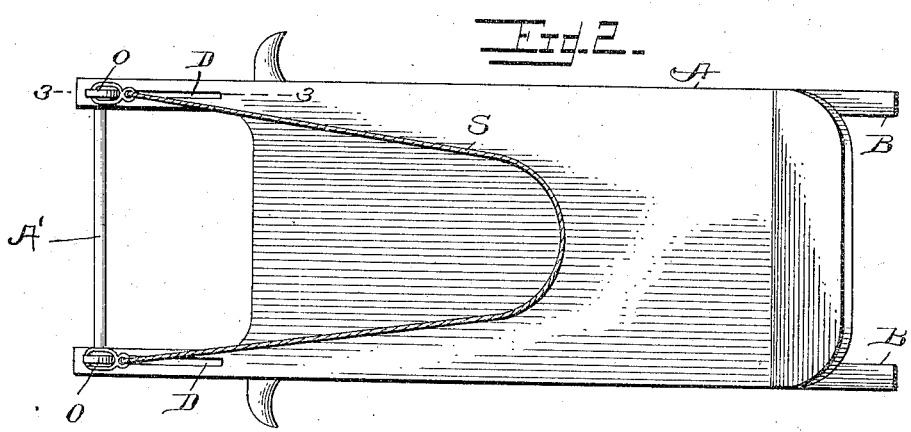
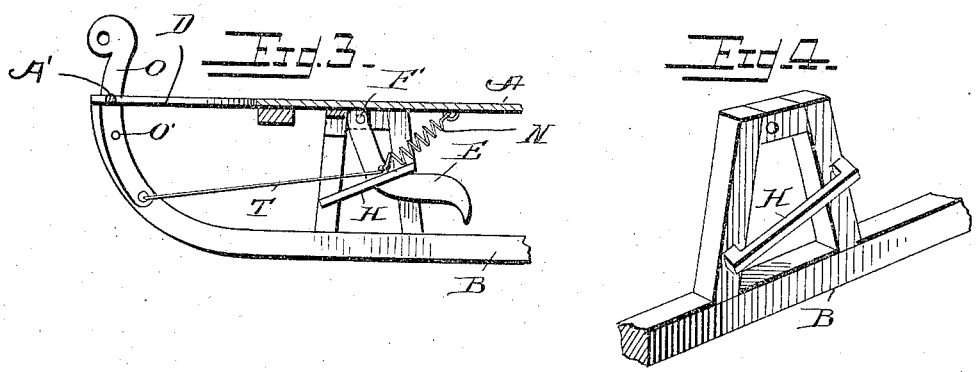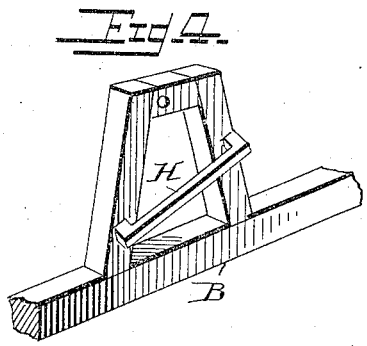
Witnesses. Inventor
Paul Hechkovech

UNITED STATES PATENT OFFICE.

PAUL HECHKOVECH, OF BURNHAM, PENNSYLVANIA.

BRAKE FOR SLEDS.

1,299,338.  Specification of Letters Patent.  Patented Apr. 1, 1919.

Application filed February 27, 1918. Serial No. 219,460.

*To all whom it may concern:*

Be it known that I, PAUL HECHKOVECH, a citizen of the United States, residing at Burnham, in the county of Mifflin and State of Pennsylvania, have invented certain new and useful Improvements in Brakes for Sleds; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in steering apparatus for sleds and consists of a simple and efficient device of this nature so arranged that the person riding upon the sled may by pulling upon cords cause the sled to turn to the right or left or straight ahead, and also forming means whereby the sled may be brought to a standstill when desired.

The invention consists of further various details of construction, combinations and arrangements of parts which will be hereinafter fully described, shown in the accompanying drawings and then specifically defined in the appended claim.

I illustrate my invention in the accompanying drawings which, with the letters of reference marked thereon, form a part of this specification and in which:

Figure 1 is a side elevation.

Fig. 2 is a top plan view.

Fig. 3 is a sectional view on line 3—3 of Fig. 2, and

Fig. 4 is a detail top plan view, a portion of the sled being broken away.

Reference now being had to the details of the drawings by letter:

A designates a sled of any suitable construction, having runners B, and the top of the sled is recessed away with forwardly contracting projecting portions which are slotted as at D. The contracted portions are connected by a round A'. Brake members E preferably of the shape shown are pivotally mounted upon pins F' upon the sled and their free ends, which are pointed, are adapted to be thrown down into the ice or snow for the purpose of guiding the sled. Guide strips H are fastened to the knees of the sled and adapted to guide the brake member E as it swings back and forth. Coiled springs N are fastened at their upper ends to the under surface of the top and their lower ends are fastened to the brake members E and serve to normally hold said members at their highest throw so that they will be normally out of contact with the surface of snow or ice. Curved levers O are pivotally mounted upon pins O' upon the forward upwardly curved ends of the runners and are adapted to pass through said slots D in which they are guided. A rod T is fastened to the lower end of each lever O and its rear end fastened to the brake member E, it being noted that there are two of said members mounted one upon each side of the sled. A rope S is fastened at its ends to the upper projecting ends of said levers O and serves as means whereby either one lever or the other may be pulled together or separately according as it may be desired to bring the sled to a standstill by forcing the ends of the brake members down into the ice or snow, or guiding the sled to the right or left, according as one lever or the other is tilted.

If desired, the rope may be dispensed with where the rider desires to lie flat upon the sled and utilize the hands for operating one or the other of said levers.

What I claim to be new is:

A sled having runners curved upwardly at their forward ends and a top recessed at its forward end, with flat contracted portions upon either side of the recess, and a round connecting the forward ends of the contracted portions, knees mounted upon the runner supporting the top and provided with an inclined bar connecting the knees and recessed on its edge next the knees, a brake member pivotally mounted between said knees and guided in the recess of said bar, a spring fastened at one end to the brake member and secured at its other end to a fixed part of the sled, a lever pivotally connected to the forward curved portion of one runner underneath the contracted portion of the top, and a rod pivotally connecting said lever and brake member.

In testimony whereof I hereunto affix my signature in presence of two witnesses.

PAUL HECHKOVECH.

Witnesses:
A. L. HOUGH,
FRANKLIN H. HOUGH.